United States Patent
Singh et al.

(10) Patent No.: US 8,942,061 B2
(45) Date of Patent: Jan. 27, 2015

(54) SEISMIC STREAMER SYSTEM AND METHOD

(71) Applicant: WesternGeco L.L.C., Houston, TX (US)

(72) Inventors: Roshitashva Singh, Oslo (NO); Johan O. A. Robertsson, Wald ZH (CH); Ottar Kristiansen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 13/934,068

(22) Filed: Jul. 2, 2013

(65) Prior Publication Data
US 2013/0294195 A1 Nov. 7, 2013

Related U.S. Application Data

(62) Division of application No. 11/114,773, filed on Apr. 26, 2005, now Pat. No. 8,477,561.

(51) Int. Cl.
| | | |
|---|---|---|
| *G01V 1/20* | (2006.01) | |
| *G01V 1/38* | (2006.01) | |
| *G01V 1/36* | (2006.01) | |

(52) U.S. Cl.
CPC .............. *G01V 1/201* (2013.01); *G01V 1/3808* (2013.01); *G01V 1/364* (2013.01); *G01V 2210/56* (2013.01)
USPC ................................ 367/20; 367/15; 367/24

(58) Field of Classification Search
CPC ..... G01V 1/201; G01V 1/3808; G01V 1/364; G01V 2210/56
USPC .......... 181/115, 118, 120; 367/10, 20, 21, 23, 367/24, 56, 58, 144, 15; 439/320, 475
See application file for complete search history.

(56) References Cited

U.S. PATENT DOCUMENTS

| | | | |
|---|---|---|---|
| 3,290,645 A | | 12/1966 | Pavey, Jr. et al. |
| 3,613,071 A | * | 10/1971 | Quay .............................. 367/20 |

(Continued)

FOREIGN PATENT DOCUMENTS

| | | |
|---|---|---|
| CN | 1608213 | 4/2005 |
| EP | 0 460 789 A1 | 12/1991 |

(Continued)

OTHER PUBLICATIONS

U.S. Appl. No. 10/233,266.

(Continued)

*Primary Examiner* — Daniel L Murphy
(74) *Attorney, Agent, or Firm* — Kevin B. McGoff

(57) ABSTRACT

A seismic streamer system for acquiring seismic data includes a plurality of first cable sections each employing a first sensor configuration therein, and at least one second cable section operatively connected to one or more of the first cable sections and employing a second sensor configuration therein. In various embodiments of the streamer system, one or more of the second cable sections are sparsely integrated into a streamer, a streamer array and/or a seismic spread. The first sensor configuration may, e.g., include a conventional hydrophone distribution, and the second sensor configuration may, e.g., include multicomponent sensors such as at least one of a particle velocity sensor, a pressure gradient sensor, an accelerometer and a combination thereof. The present invention is useful for attenuating noise in the measured seismic data as well as deghosting the data. A particular deghosting process includes decomposing the up- and down-going parts of the vertical component of particle velocity associated with the acoustic wave reflections from the strata.

24 Claims, 7 Drawing Sheets

(56) References Cited

U.S. PATENT DOCUMENTS

| | | | |
|---|---|---|---|
| 4,486,865 A | | 12/1984 | Ruehle |
| 4,493,061 A | * | 1/1985 | Ray ................................ 367/23 |
| 4,618,949 A | | 10/1986 | Lister |
| 4,649,530 A | | 3/1987 | Porter, Jr. |
| 4,735,281 A | * | 4/1988 | Pascouet ...................... 181/115 |
| 4,757,482 A | | 7/1988 | Fiske, Jr. |
| 4,789,968 A | | 12/1988 | Rice |
| 4,870,625 A | | 9/1989 | Young |
| 4,992,990 A | | 2/1991 | Langeland et al. |
| 5,357,892 A | | 10/1994 | Vatne et al. |
| 5,475,652 A | | 12/1995 | McNeel et al. |
| 5,668,775 A | | 9/1997 | Hatteland |
| 5,784,337 A | | 7/1998 | Rainey et al. |
| 5,973,995 A | * | 10/1999 | Walker et al. .................. 367/20 |
| 6,061,302 A | | 5/2000 | Brink et al. |
| 6,477,111 B1 | | 11/2002 | Lunde et al. |
| 6,483,775 B1 | | 11/2002 | Spackman et al. |
| 6,498,768 B1 | | 12/2002 | Gjestrum et al. |
| 6,512,980 B1 | | 1/2003 | Barr |
| 6,671,223 B2 | | 12/2003 | Bittleston |
| 6,684,160 B1 | | 1/2004 | Ozbek et al. |
| 6,775,618 B1 | | 8/2004 | Robertsson et al. |
| 6,827,597 B1 | * | 12/2004 | Metzbower et al. .......... 439/320 |
| 7,123,543 B2 | * | 10/2006 | Vaage et al. .................... 367/24 |
| 7,386,397 B2 | | 6/2008 | Amundsen et al. |
| 8,537,637 B2 | | 9/2013 | Laake |
| 2004/0136266 A1 | | 7/2004 | Howlid et al. |

FOREIGN PATENT DOCUMENTS

| | | |
|---|---|---|
| GB | 2 202 945 A | 10/1988 |
| GB | 2 341 680 A | 3/2000 |
| GB | 2379741 | 3/2003 |
| GB | 2 392 495 A | 3/2004 |
| GB | 2399883 A | 9/2004 |
| GB | 2410551 A | 8/2005 |
| GB | 2414299 A | 11/2005 |
| GB | 2415040 A | 12/2005 |
| WO | WO 99/53341 A1 | 10/1999 |
| WO | 0201254 A1 | 1/2002 |
| WO | WO 03/058281 A1 | 7/2003 |
| WO | WO 03/100461 A3 | 12/2003 |

OTHER PUBLICATIONS

"4-C, 4-D Seismic the Next Waves"; http:www.aapg.org/explorer/1999/04apr/mcseismic.html;, 1999.

"MSX Acitve Streamer Section"; 1999 Input/Output, Inc.

Hart's E&P Net; "Oct. 1999: Seismic: Multicomponent Monitoring"; Steve Roche; http://www.eandpnet.com/ep/previous/oct99/seismic.htm, 1999.

Hart's E&P Net; "May: Exploration Technology: Company Takes Aim at Multiclient 4-C"; Rhonda Duey; http://www.eandpnet.com/ep/previous/0502/0502exploration_tech.htm, 2002.

Mjelde; "Ocean Bottom Seismics"; Business Briefing: Exploration & Production 2003; University of Bergen.

Vuillermoz; Multicomponent Seismic Enhances Characterization of Offshore Reservoirs; http://www.findarticles.com/p/articles/mi_m3159/is_n4_v219/ai_20872441/print, 1998.

Input/Output, Inc.; "Giving Seismic a Whole New Image"; Nov. 5, 2003.

UK Search Report dated Aug. 9, 2006, for Application No. GB 0607654.1.

Office Action of Chinese Patent Application No. 201210021967.9 dated Feb. 28, 2014: pp. 1-10.

Karin M. Schwalkwijk, et al. "A Decomposition and Multiple Removal Strategy for Multicomponent OBC Data", SEG Int'l Exposition and Annual Meeting, San Antonio, Texas, Sep. 9-14, 2001, pp. 1-4.

Input/Output, Inc., "MSY Sreamer Connector Module (CSX)," 1999, pp. 1-2.

* cited by examiner

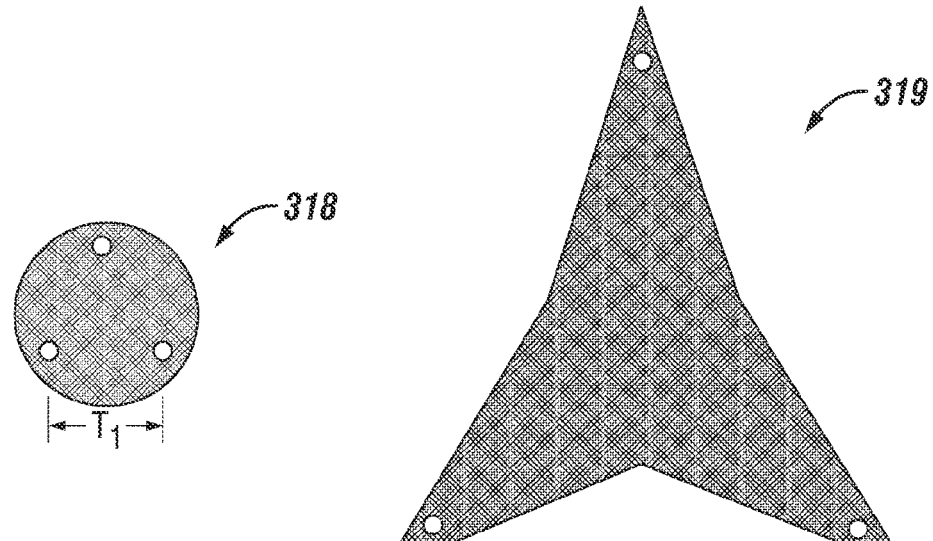
FIG. 4A
FIG. 4B
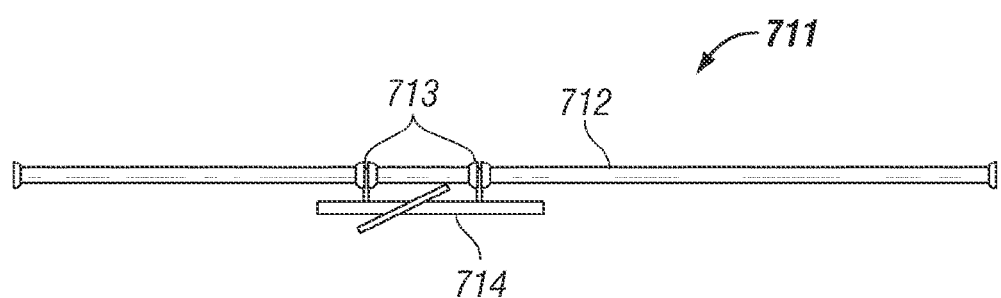
FIG. 7

SEISMIC STREAMER SYSTEM AND METHOD

CROSS-REFERENCE TO RELATED APPLICATION

This application is a continuation of U.S. patent application Ser. No. 11/114,773 filed Apr. 26, 2005, now U.S. Pat. No. 8,477,561 issued Jul. 2, 2013, which is incorporated herein by reference in its entirety.

BACKGROUND OF THE INVENTION

The present invention relates to the acquisition of seismic data in a marine environment using a plurality of towed sensor-bearing cables, known as "streamers."

DEFINITIONS

Certain terms are defined throughout this description as they are first used, while certain other terms used in this description are defined below:

"Cluster" means a plurality (i.e., more than one) of similar components that are used together.

"Geophone" means a device for detecting seismic energy in the form of particle motion during seismic acquisition (land, marine or transition zone environments).

"Hydrophone" means a device for detecting seismic energy in the form of pressure changes under water during marine seismic acquisition.

"Multicomponent" refers to a combination of seismic data sensors that includes two or more closely-spaced (within a fraction of the minimal wavelength of interest) seismic sensors such as a hydrophone, a geophone, an accelerometer, or a pressure gradient configuration of hydrophones. "4C," for example, refers to a particular type of multicomponent seismic data resulting from the combination of a hydrophone with three orthogonally oriented geophones or accelerometers.

"Operatively connected" means directly or indirectly connected for transmitting or conducting information, force, energy or matter.

SUMMARY OF THE INVENTION

In one aspect, the present invention provides a streamer system for acquiring seismic data. The streamer system includes a plurality of first cable sections each employing a first sensor configuration therein, and at least one second cable section operatively connected to one or more of the first cable sections and employing a second sensor configuration therein.

In particular embodiments of the streamer system, each of the first cable sections has substantially the same length, and each of the second cable sections has a length substantially less than the length of the first cable sections.

The first cable sections may be operatively connected in series to substantially define a single streamer. In such embodiments, the single streamer may include at least one second cable section operatively connected in series with the first cable sections. Accordingly, the one or more second cable sections may be positioned upstream of the first cable sections within the single streamer, or positioned between two of the first cable sections within the single streamer.

Alternatively, the single streamer may include at least one second cable section operatively connected in parallel with one or more of the first cable sections. Thus, for example, the single streamer may include three second cable sections connected in parallel with one or more of the first cable sections.

It will be appreciated that a plurality of streamers according to the inventive streamer system may be operatively connected in parallel to substantially define a streamer array. The streamer array may include at least one second cable section each operatively connected in series with a plurality of the first cable sections within a single streamer. Accordingly, each series-connected second cable section may be positioned upstream of the respective first cable sections within the single streamer, or positioned between two of the first cable sections within the single streamer.

Alternatively, such a streamer array may include at least one second cable section each operatively connected in parallel with the streamers. Accordingly, each second cable section may be positioned between two of the streamers, e.g., so as to substantially define a mini-streamer.

Particular embodiments of the streamer system employ a first sensor configuration adapted for measuring seismic data in an upper part of the frequency band of interest, e.g., having a frequency in the range of approximately 20 Hz to approximately 125 Hz. These embodiments further employ a second sensor configuration adapted for measuring seismic data in a lower part of the frequency band of interest, e.g., having a frequency in the range of approximately 2 Hz to approximately 20 Hz. It will be appreciated by those skilled in the art that 20 Hz is used as a representative threshold frequency that separates an "upper" frequency portion or band from a "lower" frequency portion or band. Accordingly, the phrase "approximately 20 Hz" means 20 Hz+/− an appropriate margin (e.g., 10 Hz).

In particular embodiments of the streamer system, the first sensor configuration includes a conventional hydrophone distribution, and the second sensor configuration includes multicomponent sensors. More particularly, the first sensor configuration may include a plurality of hydrophones distributed longitudinally along each first cable section. Thus, the first sensor configuration may include longitudinally spaced hydrophones, or it may include longitudinally-spaced hydrophone clusters.

In particular embodiments wherein the first sensor configuration employs hydrophone clusters, the hydrophone clusters are arranged to define a pressure gradient configuration. The hydrophone clusters have a longitudinal spacing from one another not exceeding approximately 3.125 m. The hydrophone clusters may each include at least two transversely-spaced hydrophones. Accordingly, each hydrophone cluster may include three or more hydrophones having a relatively short transverse spacing, e.g., a transverse spacing from one another not exceeding approximately 4-10 cm.

Alternatively, the first sensor configuration may include a plurality of hydrophones distributed longitudinally according to a first separation distance, and the second sensor configuration may include a plurality of hydrophones distributed longitudinally according to a second separation distance that is substantially different from the first separation distance. Thus, e.g., the first separation distance may be approximately 3.125 m, 6.25 m, or 12.5 m. The second separation distance may lie in a range of approximately 1.5 m to approximately 3 m.

In other embodiments of the streamer system, the first sensor configuration may include one or more particle motion sensors therein, such as a particle velocity sensor, a pressure gradient sensor, an accelerometer or a combination of these.

In particular embodiments of the streamer system, the second sensor configuration includes one or more particle motion sensors therein. Thus, the particle motion sensors may include at least one of a particle velocity sensor, a pressure gradient sensor, an accelerometer and a combination thereof.

Alternatively, the second sensor configuration may include one or more hydrophones. Thus, e.g., the second sensor configuration may include a plurality of longitudinally-spaced hydrophone clusters. In particular embodiments, these clusters may be spaced apart by a separation distance in the range of approximately 1.5 m to approximately 3 m.

In another aspect, the present invention provides a seismic survey spread, including a water-going tow vessel, a plurality of first cable sections operatively connected to the tow vessel, and a plurality of second cable sections operatively connected to the tow vessel. Each of the first cable sections employs a first sensor configuration therein, and each of the second cable sections includes a plurality of seismic sources distributed therealong. At least one third cable section is operatively connected to one or more of the first or second cable sections. Each of the third cable sections employs a second sensor configuration therein.

In particular embodiments of the seismic survey spread, the first sensor configuration includes a plurality of hydrophones distributed longitudinally according to a first separation distance, and the second sensor configuration includes a plurality of hydrophones distributed longitudinally according to a second separation distance that is substantially different from the first separation distance. More particularly, the first separation distance may be approximately 3.125 m, 6.25 m or 12.5 m, and the second separation distance may lie in the range of approximately 1.5 m to approximately 3 m.

In particular embodiments of the seismic survey spread, at least one of the third cable sections employs multicomponent sensors and is operatively connected to one or more of the first cable sections. Alternatively, at least one of the third cable sections employs multicomponent sensors and is operatively connected to one or more of the second cable sections.

A further aspect of the present invention relates to a seismic source system, including a plurality of first cable sections each having a plurality of seismic sources distributed therealong. At least one second cable section is operatively connected to one or more of the first cable sections. Each second cable section includes one or more particle motion sensors therein.

A still further aspect of the present invention relates to a method for acquiring seismic data in a body of water overlying earth strata. The inventive method includes the steps of generating acoustic waves using a towed source array, measuring the acoustic wave reflections from the strata using a plurality of first cable sections each employing a first sensor configuration therein, and measuring the acoustic wave reflections from the strata using at least one second cable section operatively connected to one or more of the first cable sections and employing a second sensor configuration therein. The inventive method may be implemented using one or more of the particular streamer system embodiments described herein.

In particular embodiments of the inventive method, the first sensor configuration comprises a conventional hydrophone distribution, and the second sensor configuration comprises multicomponent sensors. The acquired hydrophone measurements may be deghosted using the acquired multicomponent measurements, e.g., by determining the up-going part of the vertical component of particle velocity associated with the acoustic wave reflections from the strata. The determining step may be achieved according to the equation:

$$V_z^U = \frac{1}{2}\left(V_z - \frac{k_z}{\rho\omega}P\right),$$

where:
$V_z^U$ is the up-going part of the vertical component of particle velocity,
$V_z$ is the vertical component of particle velocity,
P is the pressure,
$k_z$ is the absolute value of the vertical wave number,
$\omega$ is the angular frequency, and
$\rho$ is the density of water.

In particular embodiments of the inventive method, one or more of the multicomponent cable sections are towed among the receiver cable sections and/or the source array.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 4A shows a cross-sectional representation of the seismic streamer of FIG. 3, taken through section line 4A-4A.

FIG. 4B shows a cross-sectional representation of the seismic streamer of FIG. 3, taken through section line 4B-4B.

FIG. 7 shows a seismic streamer having a first cable section connected to a second cable section in parallel in accordance with the present invention.

DETAILED DESCRIPTION OF THE INVENTION

Figure 1A:
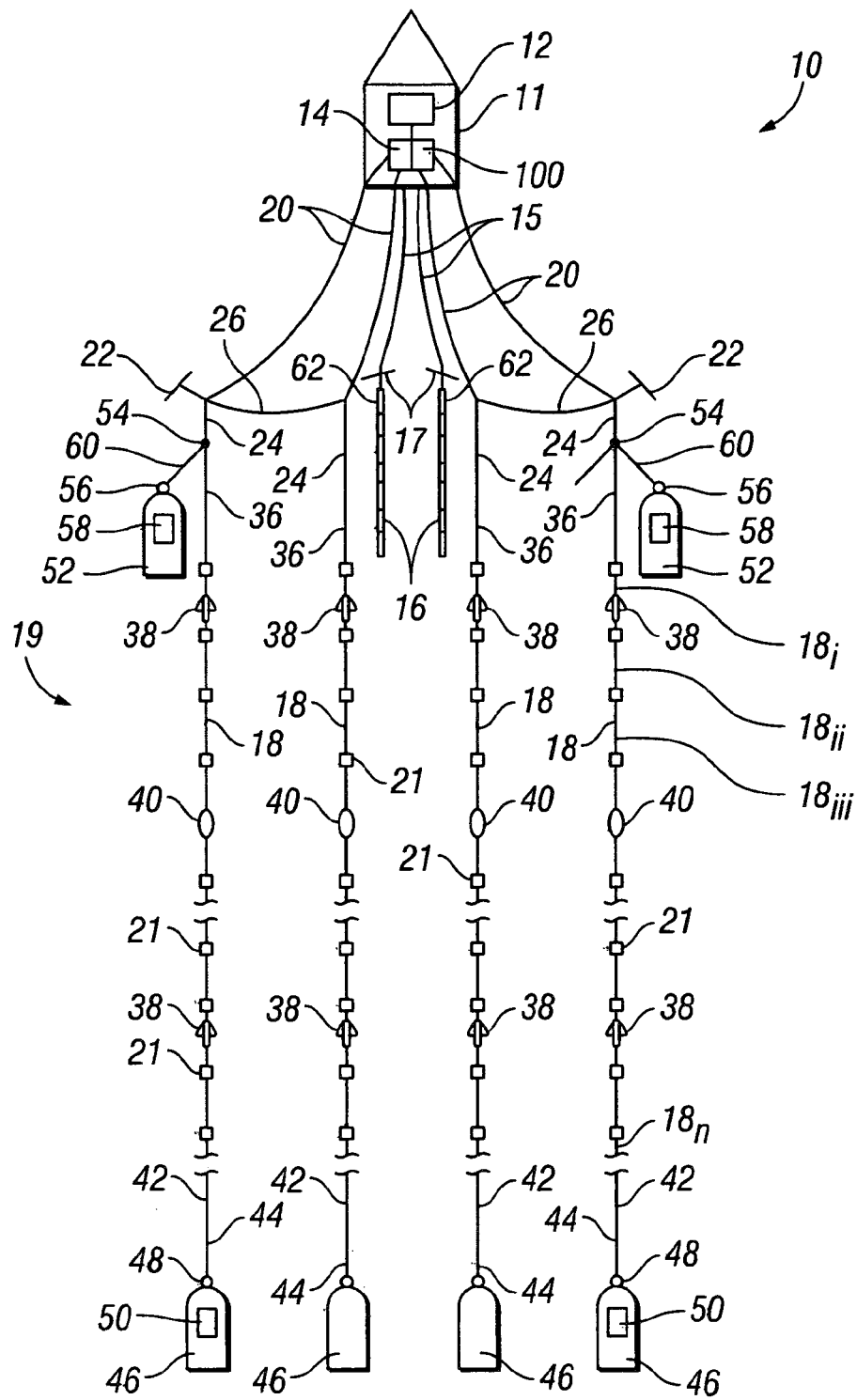
FIG. 1A is a schematic representation, in plan view, of a prior art seismic survey spread.
Figure 1B:
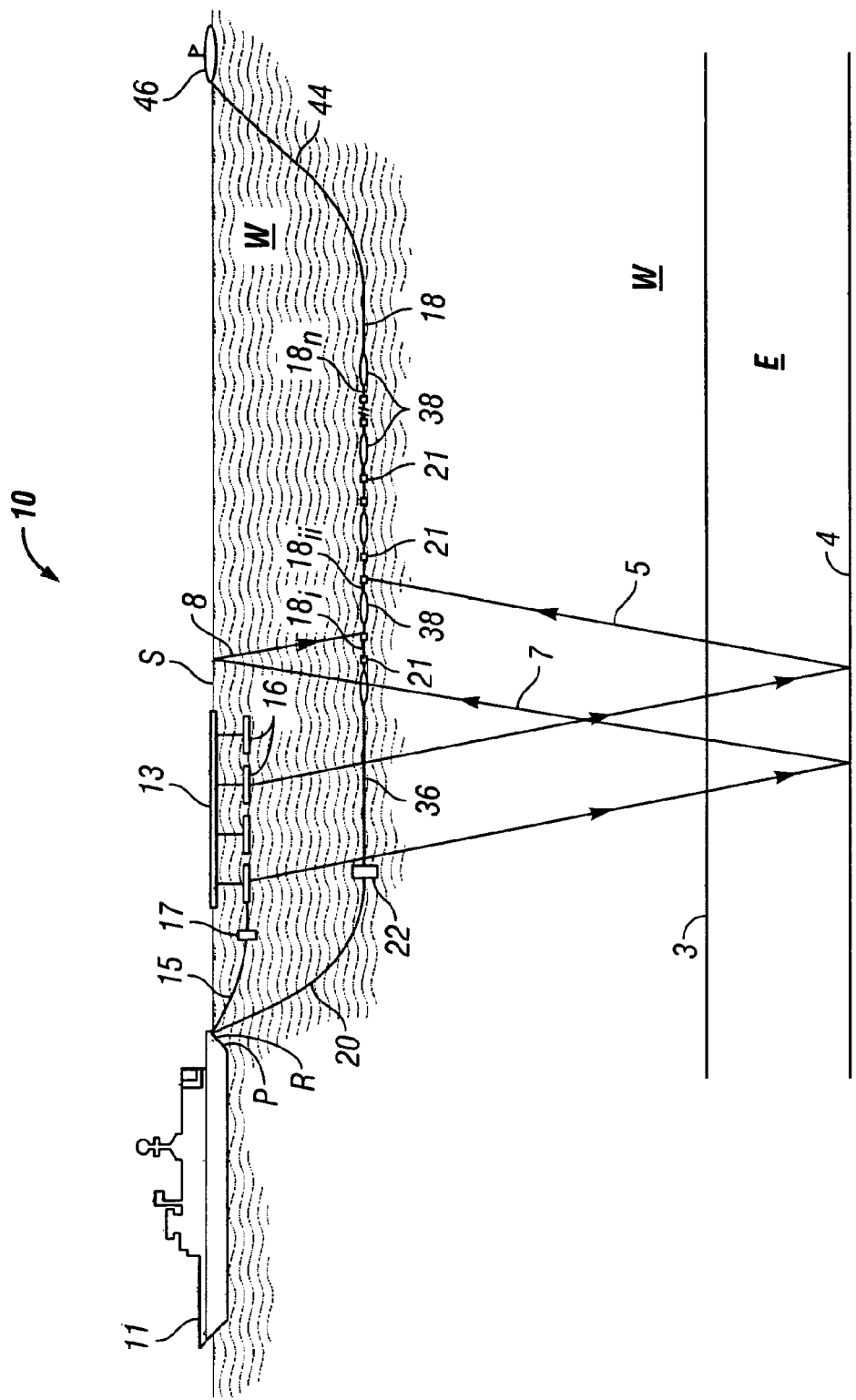
FIG. 1B is a schematic representation, in elevational view, of the seismic survey spread of FIG. 1A.

The performance of a marine seismic acquisition survey typically involves one or more vessels towing at least one seismic streamer through a body of water believed to overlie one or more hydrocarbon-bearing formations. FIGS. 1A-1B illustrate a particular marine seismic acquisition survey spread (also known simply as a "spread") 10 for performing 3D or 4D surveys in accordance with the proprietary commercial offerings of WesternGeco, the assignee of the present invention. Those having ordinary skill in the art will appreciate, however, that the present invention is not limited to use with this particular spread 10. Thus, the present invention has utility in a number of other system acquisition systems.

The spread 10 is characterized by a plurality of components, some of which are controllable and known as spread control components. The spread control components typically include a vessel rudder R, a vessel propeller P, a vessel thruster (not shown), and one or more towed devices for steering the various components that otherwise make up the spread 10.

More particularly, in the case of a Q™ vessel owned and operated by WesternGeco, the vessel 11 is provided with a GPS receiver 12 coupled to an integrated computer-based seismic navigation (TRINAV™), source controller (TRISOR™), and recording (TRIACQ™) system 14 (collectively, TRILOGY™), and tows a plurality of seismic sources 16, typically a TRISOR™-controlled multiple air gun source of the kind described in U.S. Pat. No. 4,757,482, and an array 19 of four or more substantially identical streamers 18. It will be appreciated by those having ordinary skill in the relevant art that, in practice, as many as twenty streamers can be towed, for example by using the techniques described in U.S. Pat. No. 6,498,768 assigned to WesternGeco. The streamers 18 are towed by means of their respective lead-ins 20 (i.e., the high strength steel or fiber-reinforced cables which convey electrical power, control and data signals between the vessel 11 and the streamers 18). The span of the outer-most streamers 18 is controlled by two steerable front-end deflectors (SFEDs) called MONOWING™ deflectors, indicated at 22, connected to the respective forward ends 24 of the two or more outer-most streamers. The SFEDs 22, which are described in detail in U.S. Pat. No. 5,357,892 assigned to WesternGeco, act in cooperation with respective spreader lines 26 connected between the forward end 24 of each outermost streamer 18 and the forward end 24 of its adjacent streamer to assist in maintaining a substantially uniform spacing between the streamers 18.

Each streamer 18 includes a plurality (up to 4000) hydrophone sensors 21 distributed at spaced intervals along the streamer's length. Each of the hydrophones 21 is separately wired so that its output signal can be separately digitized and filtered, thereby permitting sophisticated processing known as digital group forming, as described in U.S. Pat. No. 6,684,160 assigned to WesternGeco.

Each streamer 18 includes a large number of substantially identical "active" streamer sections $18_i, 18_{ii}, 18_{iii}, \ldots 18_n$ each approximately 100 meters in length and connected together end to end. Each active streamer section comprises an outer plastic skin that contains several elongate stress members, e.g., made of Kevlar, and the hydrophones 21 which are separated by kerosene-saturated plastic foam spacer material, as described in U.S. Pat. No. 6,477,111 assigned to WesternGeco. Alternatively, the active streamer sections may employ a "solid" construction, a fiber optic-based configuration or other configurations that are known to those having ordinary skill in the art.

Each streamer 18 further has a plurality of inline streamer steering devices (SSDs) 38, also known as "birds," such as Q-FIN™ birds of the kind described in U.S. Pat. No. 6,671,223, also assigned to WesternGeco, distributed at appropriate intervals, e.g., 200 m, therealong for controlling the streamer's depth and steering it laterally. Additionally, each streamer 18 has inline acoustic emitters or "pingers" 40 distributed therealong, the pingers being interleaved between the birds 38. The pingers 40 are part of a positioning and navigation system, and their operation is described in U.S. Pat. Nos. 4,992,990 and 5,668,775, both assigned to WesternGeco.

Each streamer 18 may be further equipped with forward (36) and rear (44) sections commonly known as "stretch" or "vibration-isolation" sections. The forward stretch sections 36 function to mechanically decouple the streamer 18 from the vessel 11, thereby preventing the application of undesirable jerking forces from the vessel 11 to the streamer 18, which would introduce substantial noise to the recorded seismic data signals. The rear stretch sections 44 function similarly with respect to the tail buoys 46, which could otherwise impose drag-induced jerking forces. The stretch sections are similar to the active streamer sections in that the stretch sections include an outer plastic skin, conducting wires, and floatation means. The stretch sections differ, however, in that they usually carry no hydrophones and lack the elongate stress members of the active sections, although elastic stress members, such as polyamide-fiber rope, form part of each stretch section to restrict its total stretch within preselected limits. A typical stretch section may be 50-250 meters long, and is capable of stretching nearly twice its own length.

The rearward ends 42 of the streamers 18, i.e., the ends remote from the vessel 11, are connected via the respective rear stretch sections 44 to respective tailbuoys 46. The tailbuoys are provided with respective pingers 48, similar to the pingers 40, and respective GPS receivers 50.

The streamer array 19 is further provided in the region of its forward end 24 with additional buoys or floats 52. More specifically, the further floats 52 are respectively connected to the streamers 18, often the four outermost streamers, at respective watertight electro-optical "tee" connectors 54 positioned between the two stretch sections 36 at the forward ends 24 of the outermost streamers, so as to be towed by the streamers. The buoys 52, which can be substantially identical to the tailbuoys 46, are provided with respective pingers 56 and GPS receivers 58, and are connected to their respective connectors 54 by respective stretch sections 60. Although the buoys 52 are shown in FIG. 1A as offset with respect to their streamers for clarity, in practice they are substantially in line with the streamers 18.

The seismic sources 16 are also provided with a GPS receiver, indicated at 62, and an acoustic receiver such as a hydrophone 21. The sources 16 may be steerable via steering devices 17, such as the devices described in U.K. Patent Application No. GB 0307018.2 assigned to WesternGeco.

Thus, when performing a seismic acquisition survey with a Q™ vessel as described above, the seismic sources 16 and the seismic streamer array 19 are deployed from the vessel 11 and towed at about 5 knots substantially in the configuration shown in FIGS. 1A and 1B. The seismic sources 16 are periodically fired, e.g., every 10 seconds or so, emitting seismic energy in the form of an acoustic wave to the water, resulting in one or more wavefields that travel coherently into the earth E underlying the water W (see FIG. 1B). As the wavefields strike interfaces 4 between earth formations, or strata, they are reflected back through the earth E and water W along paths 5 to the various hydrophones 21, where the wavefields (e.g., pressure waves) are converted to electrical signals, digitized, and transmitted to the recording/processing system 14 (see FIG. 1A) in the vessel 11 via the streamers 18 and lead-ins 20. Through analysis of these detected signals, it is possible to determine the shape, position and lithology of the sub-sea formations.

A problem encountered in marine surveying, as well as in inverse vertical seismic profiling or "VSP," is that of water column reverberation. The problem which arises as a result of the inherent reflectivity of the water surface and bed (as well as sub-sea boundaries) may be explained as follows. A seismic wave reflected from seabed 3 or sub-sea earth strata 4 passes into the water in a generally upward direction (see, e.g., waves 5, 7). Such a wave, termed the "primary," travels through the water W and past the seismic sensors 21—whether on the seabed or in a towed array (the latter being shown in FIGS. 1A-1B) —which record its presence (i.e., characteristics of the primary). The wavefield continues upwardly, e.g., along path 7, to the water's surface S, where it is reflected back downwardly. This reflected, or "ghost," wavefield 8 also travels through the water W and past the sensor(s) 21 where it is again recorded. Depending upon the nature of the earth material at the water's bottom 3, the ghost wavefield may itself be reflected upwardly through the water, giving rise to a series of one or more subsequent ghost reflections or "multiples."

In instances where the earth material at the seabed is particularly hard, excess acoustic energy or noise generated by the seismic sources 16 can also become trapped in the water column, reverberating in the same manner as the reflected seismic waves themselves. This noise is often high in amplitude and, as a result, tends to cover the weaker seismic reflection signals sought for study. This reverberation of the seismic wavefield in the water obscures seismic data, amplifying certain frequencies and attenuating others, thereby making it difficult to analyze the underlying earth formations.

Deghosting, or removal of the ghost wavefield(s), as well as the removal of so-called multiples, is therefore important for accurate characterization of earth formations. Several deghosting solutions have been proposed to date, but have been generally unsatisfactory since they are limited by one or more of following drawbacks:
streamers required to be towed close to the sea surface;
solutions are only valid up to a fraction of the first ghost notch;
poor signal-to-noise ratio at DC and notch frequencies; reliance on 2D assumptions in estimating the vertical component (Z) of pressure or particle velocity; and
operational complexity (e.g., so-called over/under streamer solutions).

A need therefore exists for a deghosting solution that has application to a wide range of problem areas, and is relatively easy and affordable to implement in seismic survey and/or data processing operations.

Thus, e.g., a need exists for a deghosting solution that eliminates surface ghost notches from the frequency spectrum so that the streamer(s) can be towed at any depth. Freedom to tow at multiple depths presents several operational advantages.

Furthermore, a need exists for cross-line wavefield characterization so as to enable true 3D solutions for determining the vertical component (Z) of pressure or particle velocity.

One of the known deghosting solutions, wavefield decomposition into up- and down-going wavefield constituents, is useful for both deghosting and noise attenuation of the measured signals. However, wavefield decomposition presently exists in commercial applications only for seabed surveys. A need therefore exists for a solution that applies full wavefield composition to towed-marine surveys.

Additionally, it is well known that rough-sea effects can be very significant during seismic acquisition surveys, and can introduce amplitude and phase perturbations into the measured signals as well as scattered coda wavefields following the arrivals. A need therefore exists for a solution that will effectively remove rough-sea perturbations.

These and other needs, objects and advantages are addressed by the present invention as described and claimed herein.

The present invention provides solutions for reducing the effects of "ghosts" and "multiples" in seismic acquisition surveys, as well as attenuating noise in the measured seismic data, and is suitable for implementation in numerous seismic acquisition systems, including conventional and "high-end" streamers. The present invention encompasses a variety of seismic sensor or receiver configurations that may generally be characterized as hybrid solutions between conventional streamer technology and non-conventional streamer technology (e.g., multicomponent sensors). Accordingly, streamers incorporating aspects of the present invention—either by discrete cable sections, separate individual streamers, or as part of a streamer array or a seismic spread—will generally be referred to hereinafter as "hybrid streamers(s)."

Spatial sampling of a seismic wavefield using discretely located sensors in a towed streamer (or streamer array) is generally governed by two separate factors. First, the seismic wavefield must be properly spatially sampled in order to avoid spatial aliasing (i.e., frequency ambiguity). Thus, e.g., if the water velocity is assumed to be 1500 m/s and if we are interested in recovering frequencies up to 125 Hz, the sampling requirement is approximately 6.25 m of separation since the shortest wavelength will be for horizontally-propagating waves inline with the streamer (the wavefield must be sampled with two sensor locations per wavelength). This is more restrictive than the conventional seismic industry spacing of 12.5 m, which assumes that very little energy propagates entirely in the horizontal direction.

Secondly, towing-induced noise in the streamer, such as swell noise or bulge waves, propagates with velocities that are much lower than the acoustic velocity in water. Fortunately, the frequency content of such noise is also substantially lower. However, in order to properly sample this noise, a sensor spacing of approximately 3.125 m is desirable and a shorter spacing (e.g., 1.5625 m) is even more desirable. This sampling criterion is thus stricter than the spatial aliasing criterion, but in principle such dense spacing is only needed locally since the aperture of a spatial filter (also known as an alias filter or an anti-alias filter) is relatively short (e.g., 2-5 sensor points). Accordingly, certain of the hybrid streamer embodiments (described further below) employ short digital groups of densely spaced elements to attenuate noise, but with a group-to-group distance that is relatively large in order to capture the signal if high frequency signals do not need to be recorded.

Some—but not all—of the hybrid streamer embodiments will employ multicomponent sensors, and may thus be considered multicomponent streamers or multicomponent cable sections. Thus, e.g., the availability of both pressure (P) and vertical component (Z) (e.g., of particle velocity) measurements in certain multicomponent, hybrid streamers permits deghosting, including multiple removal, to be conducted in similar fashion to what is presently done for seabed recordings. Provided that both pressure and particle velocity recordings are of high quality, a multicomponent streamer incorporating both measurements will provide a full bandwidth of deghosted data without compromising on the signal-to-noise ratio at notch frequencies. This, in turn, yields a number of advantages, including:

excellent low-frequency and high-frequency data (consistent with a wide range of objectives ranging from time-lapse to sub-salt and complex imaging);

improved resolution (high frequencies, short stable wavelet); and improved inversion (low frequencies, velocity model estimation).

Deterministic deghosting methodologies such as the ones proposed herein in association with hybrid streamers may effectively remove rough-sea perturbations. The rough-sea effect can be very significant and introduce amplitude and phase perturbations into the signal as well as a scattered coda wavefield following the arrivals. Removal of the rough-sea perturbations is particularly important for time-lapse (4D) processing and analyses. In general, any multi-channel processing step will smear out perturbations causing noise behind the signal. One particular example of a process that may benefit from rough-sea deghosting is multiple suppression.

Particular embodiments of a hybrid streamer according to the present invention are adapted for full wavefield decomposition into up- and down-going wavefield constituents, e.g., deghosting according to the teachings of U.S. Pat. No. 6,775,618, assigned to Schlumberger, and/or International Patent Applications Nos. WO 03/058281A1 and WO 2003/100461A3, both assigned to WesternGeco, with increased accuracy and bandwidth in the results. This is significant as it will enable the streamer depth/steering choices (as implemented by the equipment described above for FIGS. 1A-B) to be governed by the targeting of optimal quiet regimes having reduced noise, the avoidance of current influences, etc.

Accurate decomposition of the recorded data in this way opens up several solutions for multiple suppression and imaging that are currently being investigated, such as: wavefield-driven imaging of primaries and multiples (the down-going wavefield is used as the source wavefield in a wave equation imaging process); and source signature estimation (which is a pre-requisite for numerous processing steps such as Surface-Related Multiple Elimination, or SRME) using the triangular relationship between P, Z and knowledge of the source signature. In addition, the decomposition of the wavefield into up- and down-going constituents offer new possibilities to attenuate noise that propagates in the water such as engine/thruster noise or seismic interference.

A further aspect of the present invention is related to cross-line wavefield characterization that may enable true 3D solutions in a towed marine environment. Deghosting has to date generally been thought of in a 2D mode, or at best a 2.5D mode process. The present invention exhibits utility for implementing a 3D deghosting solution, as described in co-pending UK Patent Application No. GB 0413151.2, assigned to Schlumberger. Thus, a hybrid streamer according to the present invention that is towed near the sea surface allows for 3D deghosting of the vertical (Z) component of the measured seismic data. This may allow for the identification of diffracted multiples, by their arrival out of plane, and decomposition of the diffracted multiples into up- and down-going constituents, whereby multiple suppression techniques will be effective in removing them.

Cross-line wavefield characterization includes, e.g., measurements of the cross-line component of particle velocity. Since this is proportional to the first-order cross-line derivative of pressure, the two fundamental terms in a Taylor expansion of the pressure around the streamer (P and dP/dy) are automatically known. In addition, if a hybrid streamer according to the present invention is towed near the sea-surface, then the second-order cross-line derivative of pressure can also be determined, whereby the three fundamental terms in the Taylor expansion (P, dP/dy and $d^2P/dy^2$) are known. The Taylor expansion will provide significant additional information and constraints for intra-streamer interpolation of the P recordings. This is a key step in 3D Surface-related Multiple Elimination methods presently used. Most research on the subject is focused on issues related to interpolation and prediction of new source/receiver locations from recorded (incomplete) data. In addition, the Taylor expansions will allow the recorded pressure data to be extrapolated from the streamer. This, in turn, will allow for interpolation of data in a time-lapse (4D) survey to better match the recording positions in the base survey.

Thus, it will be appreciated by those having ordinary skill in the art that accurate characterization of the polarization and direction of arrival of events can under some circumstances (e.g., single arrivals) allow for filtering of complex noise phenomena and identification of diffracted multiples.

A further aspect of the present invention relates to the ability to tow a hybrid streamer at any depth, since the receiver surface ghost notches are eliminated from the frequency spectrum. This is possible because the pressure gradient/velocity measurement provided in certain of the hybrid streamer embodiments is a complementary measurement to the pure dynamic pressure measurement, and is at its maximum when the pressure hits its minimum at the pressure notch frequency and vice versa.

Streamer depth and noise from sea swells are directly related. The closer a streamer is towed to the surface, the higher the pressure notch frequency gets. Therefore, the tendency is to tow streamers shallow to recover higher frequencies. However, shallower tow puts the streamer closer to sea swells, and the measurements become noisier. Such weather noise is one of the largest contributors to non-productive marine survey time today, and a large consideration needs to be placed on sea conditions when designing surveys. Freedom of shooting depth therefore is a key operational advantage, and increases the operational window by decreasing non-productive time.

Particular examples of the inventive hybrid streamer solutions are multicomponent streamers that contain not only hydrophones recording dynamic pressure due to propagating seismic waves, but also sensors that can measure particle motion, such as the particle velocity vector (or time derivatives of particle velocities, etc.), in the three Cartesian directions, $V_x$, $V_y$, and $V_z$. It will be appreciated that other particle motion sensors, such as accelerometers and pressure gradient sensors (including hydrophone cluster arrangements), may be employed to advantage.

Development of a fully integrated multicomponent streamer solution having, e.g., a pressure measurement and a vertical pressure gradient measurement and/or an acceleration measurement is technically challenging, expensive and time consuming. A particular challenge is to implement the desired acoustic performance into a streamer having a relatively small diameter, e.g., 45 mm, in a cost-effective manner.

Accordingly, one aspect of the present invention relates to the discovery that multicomponent sensors may be selectively (e.g., sparsely) integrated with conventional streamers to achieve many of the same results of a fully-integrated solution (e.g., an array of streamers each extensively employing multicomponent sensors) without the attendant difficulties and costs. The sparsely-integrated multicomponent streamer solutions may employ cable sections as short as 1 m, or less, that are equipped with particle motion sensors, such as particle velocity sensors, pressure gradient sensors, and/or acceleration sensors. These short sections may be inserted in the front of the spread (e.g., at the front of each streamer) or distributed in the whole spread.

Multicomponent sensors may be integrated into other parts of the seismic spread where such measurements are feasible and of particular interest, as described further below. Furthermore, hybrid streamers according to the present invention, including the sparse multicomponent solutions, may be used in connection with other methods and processing techniques.

As previously mentioned, acoustic wavefield decomposition can be carried out so that the resulting quantities represent up- and down-going components of either vertical particle velocity or pressure. The following equation is useful for decomposing the data (in the frequency-wavenumber domain) into up- and down-going particle velocities:

$$V_z^U = \frac{1}{2}\left(V_z - \frac{k_z}{\rho\omega}P\right), \quad (1)$$

where:
$V_z^U$ is the up-going part of the vertical component of particle velocity,
$V_z$ is the vertical component of particle velocity,
P is the pressure,
$k_z$ is the absolute value of the vertical wave number,
$\omega$ is the angular frequency, and
$\rho$ is the density of water.
Equation (1) can be implemented quite accurately as a spatial filter along each streamer.

A number of advantages can be obtained by computing the up-going vertical component of particle velocity instead of pressure, partly because the spatial filter acts on pressure recordings and not vertical component of particle velocity. Thus, deghosting, as well as related operations and processes, can be achieved at the location of a single multicomponent measurement or sample integrated between (or with) pressure measurements in a streamer.

The above-mentioned decomposition and 3-D deghosting techniques can therefore be fully applied for the extreme case of one single multicomponent measurement integrated in a "conventional streamer" recording pressure. Although the deghosted data is only achieved at the location of the multicomponent streamer measurement, such "sparse" solutions are important for a number of reasons, including: calibrated processing solutions for deghosting; and helping to identify and remove so-called complex diffracted multiples for instance.

Additionally, the above-mentioned cross-line wavefield characterization technique for interpolation and extrapolation of recorded pressure data relies on spatial filtering of pressure data and can therefore also be applied to sparse multicomponent configurations (with some limitations).

A particular challenge faced in the development of a multicomponent streamer is to develop a sensor that is capable of simultaneously covering both the upper part of the frequency band of interest (e.g., roughly 20 Hz-125 Hz) as well as the lower part of the frequency band of interest (e.g., approximately 2 Hz-20 Hz). Accelerometers, particle velocity sensors and pressure gradient sensors represent some of the various alternatives for measuring the vector quantity of a seismic wavefield (direction of motion of individual particles as an acoustic/seismic wave passes). The present invention is adapted for employing and may employ each of these types of sensors, as well as others.

Pressure gradient sensors, e.g., may consist of at least two closely, transversely spaced hydrophones (e.g., a few cm apart), as described in U.K. Patent Application No. GB 0402012.9 filed on Jan. 30, 2004. The pressure gradient is obtained by computing the difference between the dynamic pressure measurements of two or more hydrophones in such a configuration. This difference, in turn, is proportional to particle acceleration through the equation of motion (Newton's second law). For completeness, it should be kept in mind that pure pressure recordings (i.e., dynamic pressure due to propagating waves as recorded by hydrophones) should be obtained side by side with the pressure gradient recordings as both quantities are required in seismic data processing.

As previously mentioned, a particular challenge for pressure gradient sensors has been to keep the diameter of the steamer thin to reduce drag, streamer noise, etc. This puts a bound on the spacing or separation distance between the hydrophones that make up a pressure gradient configuration. Decreases in this separation distance will forfeit the ability to recover the lowest frequencies. This problem is thus particularly relevant to the computation of pressure gradient in the transverse direction. In-line pressure gradient computation is seldom a problem since the hydrophones spacing is much greater (e.g., 3.125 m), and is typically sufficient to compute the in-line pressure gradient over the entire frequency band of interest.

Accordingly, multicomponent streamers may be equipped with two sets of particle velocity (or equivalent) sensors, as described further below. One set of sensors may be optimized to cover the highest part of a frequency band of interest. These sensors are distributed throughout the streamer at a denser interval compared to the other set of sensors which cover the lower part of the frequency band of interest. The two sets of streamers may or may not be interspersed, depending on the particular configuration. After acquisition, the seismic data from the two sets of sensors are merged together such that the lower part of the frequency band of interest comes from the coarser distributed sensors whereas the higher part of the frequency band of interest comes from the denser distributed sensors.

Figure 2:
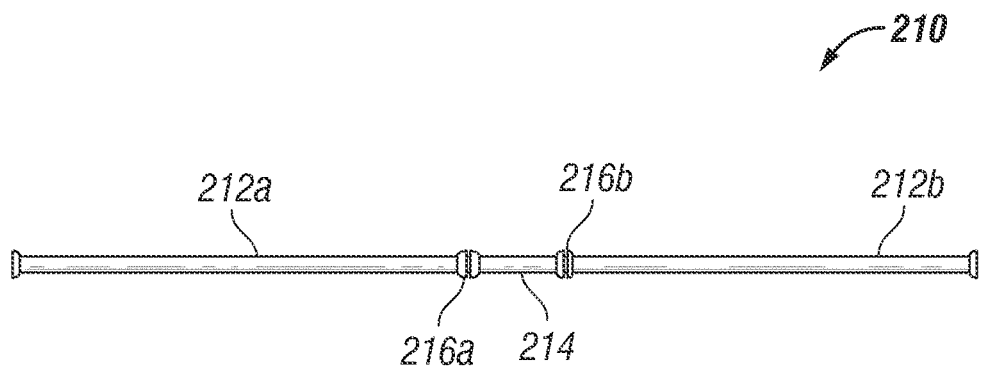
FIG. 2 shows a seismic streamer having a pair of first cable sections separated by a second cable section, the three cable sections being connected in series in accordance with the present invention.

With reference now to FIG. 2, one aspect of the present invention provides a hybrid streamer system 210 (shown as a single streamer) for acquiring seismic data. The streamer system 210 includes at least a pair of first cable sections 212*a*, 212*b* each employing a known sensor configuration therein, including but not limited to a conventional hydrophone configuration. The first cable sections are formed in a known manner (see description of streamer 18 above), and have substantially the same length (e.g., 100 meters).

A single second cable section 214 is operatively connected in series to the first cable sections 212*a*, 212*b* via respective connectors or couplers 216*a*, 216*b*, thereby defining at least a portion of a single streamer. The second cable section 214 has a length less than the length of the first cable sections, and employs a second sensor configuration therein. The second configuration is a multicomponent configuration, making the second cable section 214 a sparsely-integrated, multicomponent streamer section. It should be noted, however, that the length of the second cable section may vary, and may even exceed the length of the first cable sections 212*a*, 212*b*, if so desired.

Figure 3:
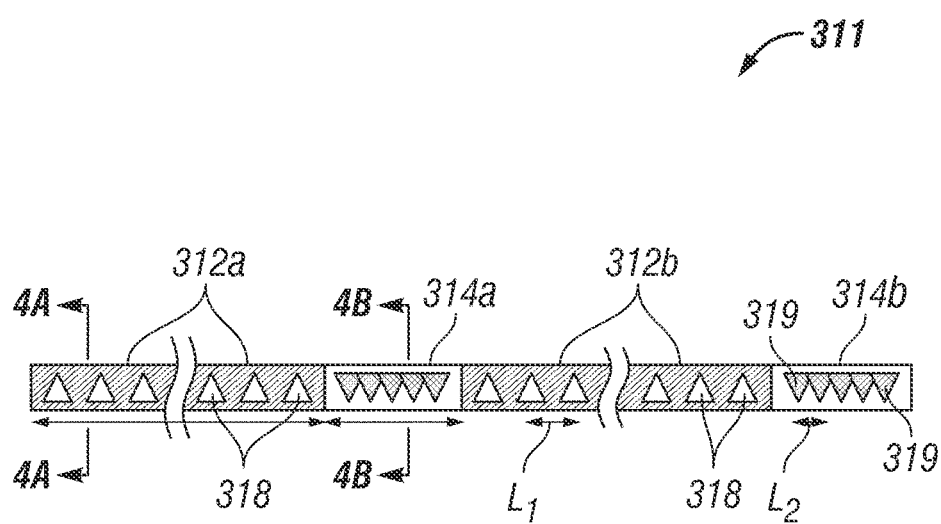
FIG. 3 shows a schematic representation of a seismic streamer having alternating first and second cable sections, all connected in series in accordance with the present invention.

FIG. 3 shows a schematic representation of a hybrid seismic streamer 311 having alternating first and second cable sections, all connected in series in accordance with the present invention. It will be appreciated by those having ordinary skill in the art that this alternating or staggered cable configuration could be extended throughout the streamer 311, even though only two of the second cable sections 314a, 314b are shown for clarity.

The streamer 311 includes first cable sections 312a, 312b each employing a first sensor configuration that includes a conventional hydrophone distribution. More particularly, the first sensor configuration may include a plurality of hydrophones distributed longitudinally along each first cable section 312a, 312b. Thus, the first sensor configuration may include longitudinally spaced hydrophones, or it may include longitudinally-spaced hydrophone clusters 318. In the embodiment depicted for streamer 311, the hydrophone clusters 318 may have any desired longitudinal spacing $L_1$ from one another. One such spacing, e.g., 3.125 meters (123 inches)), may provide sufficient separation to compute the in-line pressure gradient over the entire frequency band of interest while also producing sufficient hydrophone "density" to allow digital group forming (e.g., in a Q™-configured vessel as described above) to attenuate towing-induced noise. It will be appreciated, however, that other longitudinal spacings may be employed to advantage (e.g., approximately 6.25 m, 12.5 m, or others).

FIG. 4A shows a cross-sectional representation of the seismic streamer 311 of FIG. 3, taken through section line 4A-4A. In particular embodiments employing hydrophone clusters, the hydrophone clusters each include at least two transversely-spaced hydrophones that define a pressure gradient configuration. Although only two hydrophones are needed to measure the gradient of the wavefield in one direction, three hydrophones along inclinometer measurements allow the vertical pressure gradient to be determined independently of the orientation of the streamer 311 as it may rotate and twist. Accordingly, each hydrophone cluster defines a pressure gradient configuration or "sensor" that includes three hydrophones having a minimum transverse spacing $T_1$ from one another of, e.g., approximately 3 cm (~1.2 inches), enabling the streamer 311 to be relatively thin. Although these figures do not represent hydrophones recording pure pressure data, it will be appreciated by those having ordinary skill in the art that pure pressure data is required for processing the above-mentioned multicomponent data, and can be obtained by averaging the responses of the hydrophones that are part of the pressure gradient configuration or by including an extra hydrophone next to the pressure gradient configuration.

The streamer 311 further includes second cable sections 314a, 314b each employing a second sensor configuration that includes a non-conventional hydrophone distribution. More particularly, the second sensor configuration of this inventive embodiment may include a plurality of hydrophone clusters 319 distributed longitudinally along each second cable section 314a, 314b according to a separation distance or spacing that is different from that of the first cable sections 312a, 312b. This feature is not essential for all embodiments (i.e., different cable sections of other embodiments may employ sensors having the same longitudinal spacing).

Additionally, the second cable sections 314a, 314b may be shorter than the first cable sections of streamer 311. In some embodiments, the second cable sections are also thicker than the first cable sections to allow the hydrophones therein to be transversely-spaced further apart. This configuration will complement the limitation of the narrow hydrophone spacing in the first cable sections (e.g., 3 cm apart) which prevents the recovery of frequencies below approximately 20 Hz. It may be advantageous in some embodiments for the second cable sections 314a, 314b to employ a non-circular cross-section for improved flow properties in the water. FIG. 4B therefore shows a substantially triangular cross-sectional representation of the seismic streamer 311, taken through section line 4B-4B of FIG. 3. Thus, by employing a transverse hydrophone spacing $T_2$ of approximately 24 cm in the second cable sections 314a, 314b, frequencies as low as 2 Hz can be recovered. In other words, seismic streamers equipped like streamer 311 may be able to recover the entire frequency band from 2 Hz and upwards.

It may also be desirable in certain embodiments for the second cable sections 314a, 314b to be as short as possible to facilitate digital group forming to attenuate towing-induced noise. FIG. 3 thus illustrates a short group of five hydrophones longitudinally spaced in a dense configuration, e.g., at a separation distance $L_2$ lying in the range of approximately 1.5 m to approximately 3 m (e.g., 1.5625 m (~61.5 inches)), permitting the length of each second cable section 314a, 314b to be shortened (e.g., to approximately 9.375 m (~369 inches)). The present invention is adaptive to other configurations. Thus, for instance, if the longitudinal hydrophone spacing in the second cable sections is set at 0.78125 m (~30.8 inches), and three spaced hydrophones (or hydrophone clusters) are deemed sufficient, then these cable sections could be as short as 3.125 m (~123 inches). It will be appreciated that the present invention encompasses many other sensor configurations, including sensor types and positioning, and may or may not exhibit particular deghosting utility in all configurations.

Since it is only the lowest part of the frequency band (approximately 2 Hz-20 Hz) that is not necessarily sampled in the first cable sections 312a, 312b, it is desirable to ensure that the distance(s) between second cable sections 314a, 314b satisfy the Nyquist criterion for acoustic/seismic waves (i.e., taking two or more samples or measurements per cycle for the highest frequency present). The shortest wavelengths (93.75 m) in the lower frequency band will occur at approximately 20 Hz for waves propagating in-line with the streamer 311. It is therefore important—at least in theory—to sample this part of the wavefield at appropriate spacing intervals, e.g., approximately 46.875 m. However, since waves tend to arrive more from the vertical direction, this spacing interval can be relaxed to permit greater separation of the second cable sections 214a, 214b (e.g., 93.75 m).

The second cable sections 314a, 314b may alternatively employ a second sensor configuration that includes other multicomponent sensor types. Thus, e.g., in particular embodiments of the streamer system, the second sensor configuration includes one or more particle motion sensors therein. Thus, the particle motion sensors may include at least one of a particle velocity sensor, a pressure gradient sensor, an accelerometer and a combination thereof. If accelerometers are employed by the second cable sections instead of hydrophones, however, it may be appropriate to choose a sensor that is not suited for the high frequencies. In such cases, the second cable sections 314a, 314b may need to contain different types of particle velocity sensors—e.g., in a side by side arrangement—to allow a continuous sampling of the highest part of the frequency band (as well as the hydrophones recording pressure of course).

FIGS. 2-3 thus illustrate streamer solutions employing a plurality of first cable sections operatively connected in series with one or more second cable sections. While the second cable sections of these figures are shown connected between two first cable sections, the present invention is not so limited. Additionally, it will be appreciated that the first and second sensor configurations may be varied from the configurations described for FIGS. 2-3. Thus, e.g., the first sensor configuration may employ conventional hydrophones that are suited for measuring frequencies in the entire frequency band (e.g., 2 Hz-150 Hz), while the second sensor configuration may employ particle motion sensors (collocated with hydrophones) that are only suited for measuring frequencies in the upper part of the frequency band of interest (above approximately 20 Hz). In this fashion, hydrophone data only is used to process the seismic data in the lower frequency band (approximately 2 Hz to 20 Hz) whereas particle motion sensor in combination with hydrophone data is used to process the seismic data in the upper band (above approximately 20 Hz).

Figure 5:
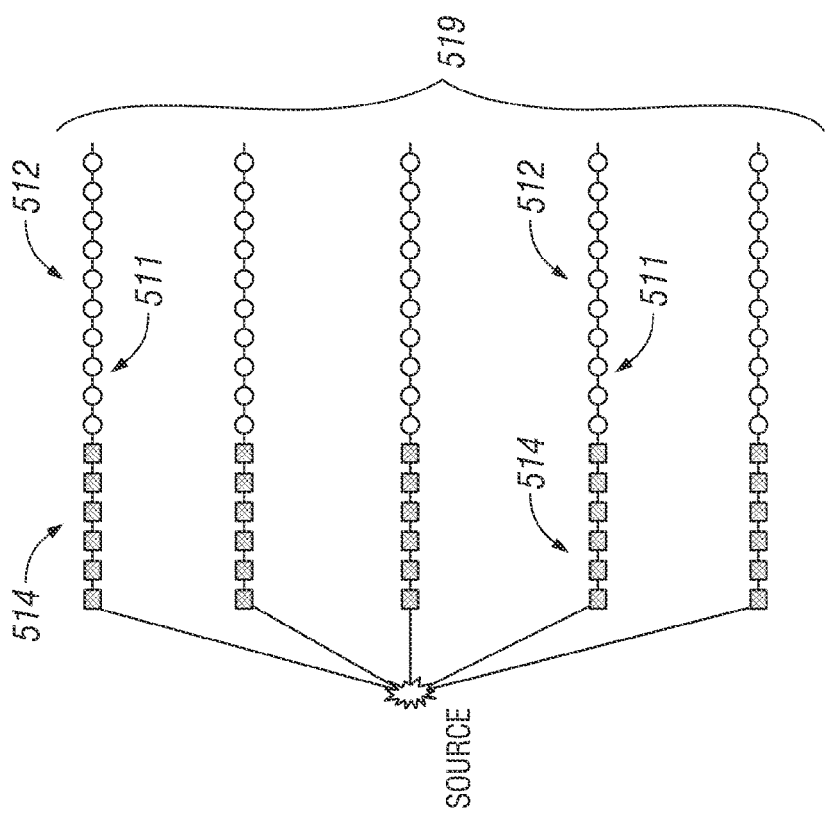
FIG. 5 shows a seismic streamer array having a plurality of first cable sections connected, at respective upstream positions, to a plurality of respective second cable sections in series in accordance with the present invention.

In order to remove ghosts and surface-related multiples, it is particularly important to characterize the seismic wavefield at near-offsets (e.g., to decompose the wavefield into its up- and down-going constituents or to interpolate/extrapolate data to missing cross-line or near in-line offset locations). Accordingly, with reference now to FIG. 5, one or more second cable sections 514 each employing multicomponent sensor configurations may be positioned upstream of a plurality of interconnected first cable sections 512 each employing conventional sensor configurations (e.g., longitudinally-spaced hydrophones) within a plurality of discrete hybrid streamers 511 making up a streamer array 519.

Figure 6:
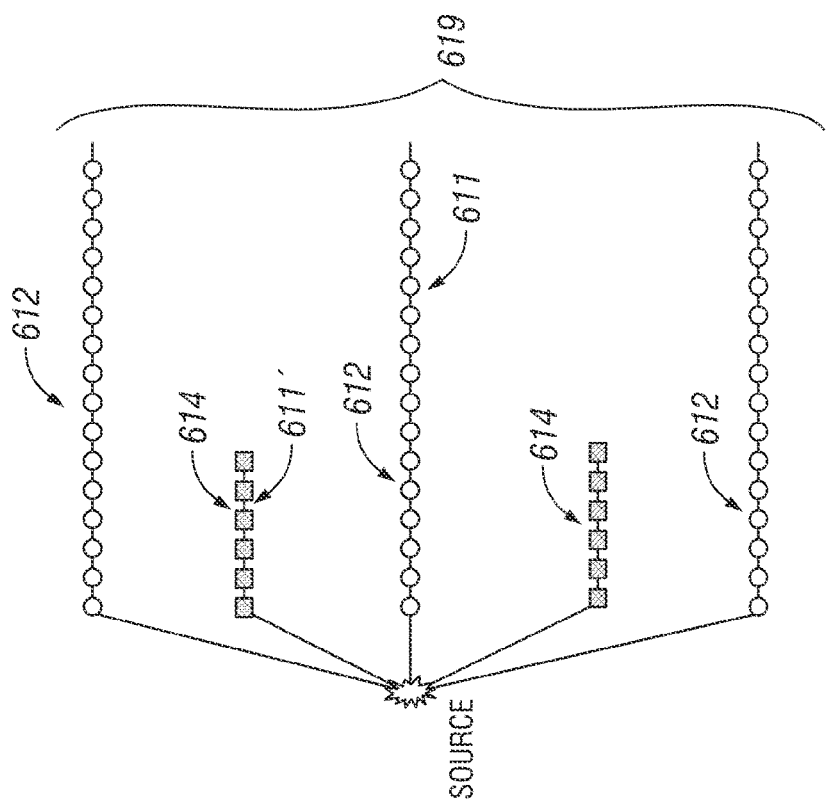
FIG. 6 shows a seismic streamer array having a plurality of first cable sections operatively connected to a plurality of second cable sections in parallel in accordance with the present invention.

Alternatively, as shown in FIG. 6, one or more second cable sections 614 each employing multicomponent sensor configurations may be positioned in parallel fashion between respective pluralities of interconnected first cable sections 612 each employing conventional sensor configurations (e.g., longitudinally-spaced hydrophones). The first cable sections 612 make up pluralities of discrete streamers 611, while the second cable sections make up short hybrid streamers 611'. The streamers 611 and hybrid streamers 611' collectively define a streamer array 619.

Alternatively, a seismic streamer according to the present invention may include at least one second cable section operatively connected in parallel with one or more of the first cable sections. Thus, FIG. 7 shows a hybrid seismic streamer 711 having a first cable section 712 connected to a single second cable section 714 in parallel. The second cable 714 contains a second sensor configuration, like the particle velocity, pressure gradient, and/or acceleration sensors described above. A releasable clamping assembly 713, similar to that employed by certain streamer steering devices (SSDs) acoustic transceivers, or other clamp-on devices known to those having ordinary skill in the art secures the second cable section 714 to the first cable section 712. Power and communication between the first and second cable sections can either be hardwired through the clamping assembly 713, or be made available through known inductive or acoustic coupling solutions.

Figure 8A:
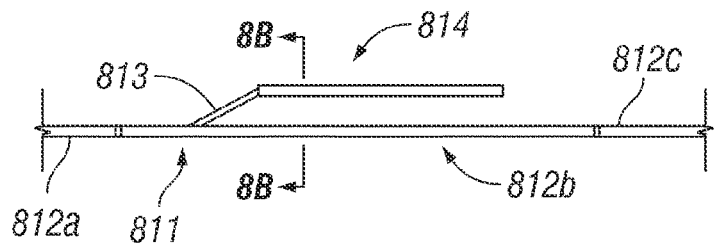
FIG. 8A shows an alternative version of a seismic streamer having a first cable section connected to a second cable section in parallel, in accordance with the present invention.
Figure 8B:
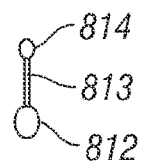
FIG. 8B shows a cross-sectional view of the seismic streamer of FIG. 8A, taken through section line 8B-8B.

FIGS. 8A-8B show an alternative parallel configuration to that illustrated in FIG. 7. Thus, a short cable section 814 defines a mini-streamer that is towed at a short transverse distance from a central streamer cable section 812b of a streamer 811. The streamer 811 further includes operatively-connected first cable sections 812a, 812c. Each of the cable sections 812a-c may be equipped with identical sensor configurations, e.g., longitudinally-spaced hydrophones. The cable section 812b is interconnected between the first cable sections 812a, 812c, and cooperates with the cable section 814 to define a hybrid cable section having a different sensor configuration from the first cable sections. A semi-rigid "take-out" device 813 is used to create and maintain the proper transverse separation and orientation for the mini-streamer 814 relative to the cable section 812b. The mini-streamer 814 can be a very short, slim cable section containing conventional hydrophones, and its relatively-fixed geometry—compared to the cable section 812b—can be exploited to form, e.g., "difference pairs" of hydrophones in conjunction with the cable section 812b. The min-streamer 814 and cable sections 812a-c thus cooperate to define a multicomponent solution for streamer 811. The mini-streamer 814 can be made slim for the additional reason that it does not need to contain heavy construction elements such as large diameter power wires, stress members, etc.

The take-out 813 can be provided by one of several types of mechanical or electro-mechanical orienting devices that are suitable for keeping the mini-streamer 814 at a desirable transverse separation distance from the cable section 812b. Examples of suitable devices include electrically or hydraulically actuated arms, floatation devices, static or controlled winglets, or a combination of these. The load requirements on the take-out are quite low, permitting its design to be optimized with respect to flow/turbulence concerns and operational ease of use.

The ability to utilize conventional hydrophones arrangements in the multicomponent streamer 811 is a significant advantage. Risks and technical challenges attendant in developing a hydrophone pressure gradient configuration having transverse spacing constraints (as described above) will not be present with this configuration.

Figure 9A:
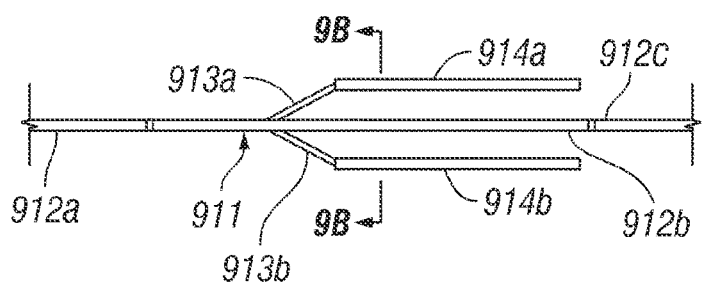
FIG. 9A shows a seismic streamer having a first cable section connected to three second cable sections in parallel, in accordance with the present invention.
Figure 9B:
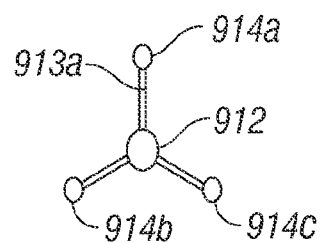
FIG. 9B shows a cross-sectional view of the seismic streamer of FIG. 9A, taken through section line 9B-9B.

FIGS. 9A-9B show a seismic streamer 911 having at least two first cable sections 912a, 912c interconnected via cable section 912b. The cable section 912b, which may be equipped with an identical sensor configuration to that of the first cable sections 912a, 912c (e.g., longitudinally-spaced hydrophones), is connected to three outer cable sections 914a-c in parallel. The three outer cable sections represent radially-distributed mini-streamers that are identical with respect to sensor type and configuration. The mini-streamers 914 are also well-adapted for employing conventional hydrophone arrangements. The mini-streamers 914 cooperate with the cable section 912b to define a hybrid cable section. Accordingly, a direct subtraction (vector) of the pressure measurements will yield the pressure gradient across the separation of the mini-streamers. In effect, this configuration is equivalent to a multicomponent streamer with a radius of the distance of the mini-streamers 914a-c from the geometric center. It will be recognized that various other min-streamer configurations may be employed to advantage.

Those having ordinary skill in the art will appreciate that the present invention provides for numerous configurations having utility in a seismic survey spread. The particular embodiments described above all relate to the implementation of the present invention in one or more seismic streamers or receiver cables. The present invention also exhibits utility in other areas of a seismic spread. Thus, e.g., the hybrid cable sections and/or the hybrid streamer configurations described above can also be used in the proximity of the seismic source(s).

Figure 10:
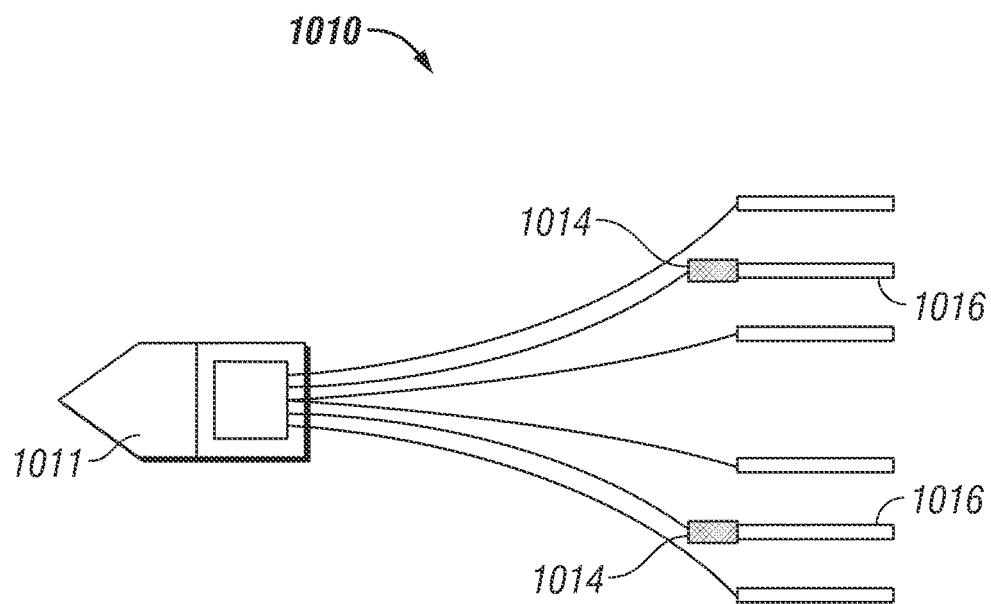
FIG. 10 shows a plan view of multicomponent cable sections towed among the source array in accordance with the present invention.

FIG. 10 shows a simplified seismic spread 1010 (streamers and other components omitted for clarity), wherein a seismic vessel 1011 tows a plurality of operatively-connected source arrays 1016 equipped with two multicomponent cable sections 1014 towed at upstream locations among the source arrays.

Figure 11:
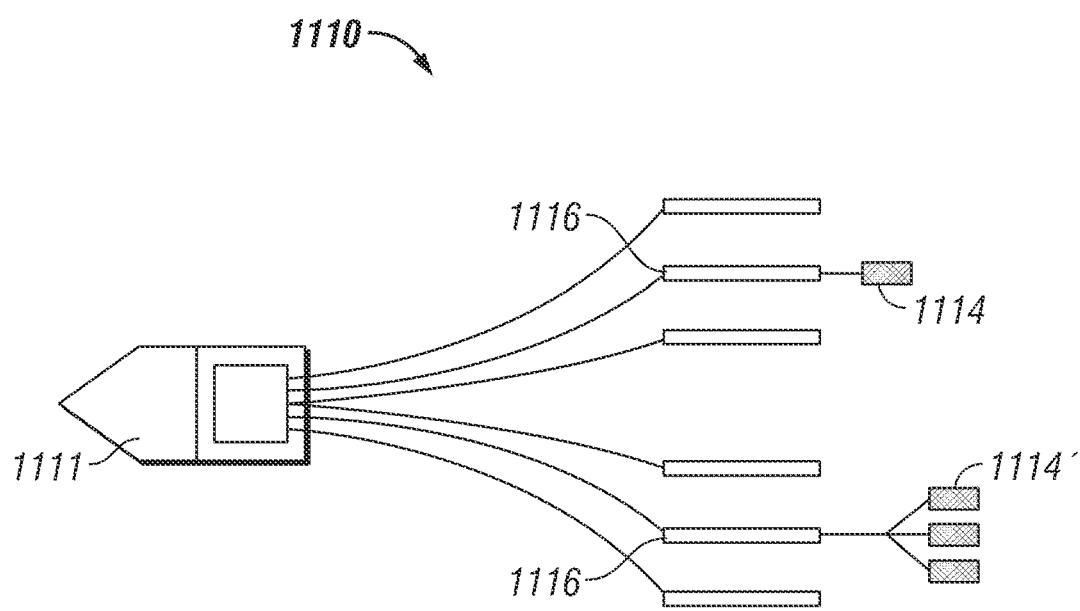
FIG. 11 shows a plan view of alternative multicomponent cable configurations towed among the source array in accordance with the present invention.

FIG. 11 shows a simplified seismic spread 1110 (streamers and other components again omitted for clarity), wherein a seismic vessel 1111 tows a plurality of operatively-connected source arrays 1116 equipped with alternative multicomponent cable configurations 1114, 1114' towed at downstream locations among the source arrays.

It will therefore be appreciated that the present invention, in its various embodiments and implementations, is well suited for acquiring seismic data in a body of water overlying earth strata. In particular, the alternative sensor configurations (e.g., multicomponent sensors) are useful for deghosting the acquired seismic data, as well as performing other operations (e.g., noise attenuation), and thereby considerably improving results of a seismic survey.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open set or group. Similarly, the terms "containing," having," and "including" are all intended to mean an open set or group of elements. "A," "an" and other singular terms are intended to include the plural forms thereof unless specifically excluded.

The invention claimed is:

1. A method for acquiring seismic data in a body of water overlying earth strata, comprising:
generating acoustic waves using a towed source array;
measuring acoustic wave reflections from the strata using a plurality of first cable sections each employing a first sensor configuration therein; and
measuring the acoustic wave reflections from the strata using at least one second cable section operatively connected between two of the first cable sections and employing a second sensor configuration therein.

2. The method of claim 1, wherein:
each of the first cable sections has substantially the same length; and
each of the at least one second cable section has a length substantially less than the length of the first cable sections.

3. The method of claim 1, wherein the first cable sections are operatively connected in series to substantially define one or more single streamers, and wherein each second cable section comprises two or more cable sections operatively connected in parallel.

4. The method of claim 3, wherein each single streamer comprises at least one second cable section operatively connected in parallel with one or more of the first cable sections.

5. The method of claim 3, wherein a plurality of streamers are operatively connected in parallel to substantially define a streamer array.

6. The method of claim 5, wherein the streamer array comprises at least one second cable section each operatively connected in series with a plurality of the first cable sections within each single streamer.

7. The method of claim 6, wherein each series-connected second cable section is positioned upstream of the respective first cable sections within each single streamer.

8. The method of claim 6, wherein each series-connected second cable section is positioned between two of the first cable sections within each single streamer.

9. The method of claim 5, wherein the streamer array comprises at least one second cable section each operatively connected in parallel with the streamers.

10. The method of claim 9, wherein each second cable section is positioned between two of the streamers.

11. The method of claim 10, wherein each of the second cable sections substantially defines a mini-streamer.

12. The method of claim 1, wherein the first sensor configuration is adapted for measuring seismic data having a frequency in the range of approximately 16 Hz to approximately 125 Hz.

13. The method of claim 1, wherein:
the first sensor configuration comprises a distribution of hydrophones; and
the second sensor configuration comprises multicomponent sensors.

14. The method of claim 13, further comprising:
deghosting measurements acquired by the hydrophones using measurements acquired by the multicomponent sensors.

15. The method of claim 14, wherein the deghosting comprises determining an up-going part of a vertical component of particle velocity associated with acoustic wave reflections from the strata.

16. The method of claim 1, wherein:
the first sensor configuration comprises a plurality of hydrophones distributed longitudinally according to a first separation distance; and
the second sensor configuration comprises a plurality of hydrophones distributed longitudinally according to a second separation distance that is substantially different from the first separation distance.

17. The method of claim 1, wherein the first sensor configuration includes sensors of a first type, and the second sensor configuration includes sensors of a second, different type.

18. The method of claim 17, wherein the second sensor configuration comprises one or more particle motion sensors therein.

19. The method of claim 1, wherein a particular one of the first cable sections has a first cross-sectional size, wherein first sensors are transversely spaced across a cross section of the particular first cable section at a longitudinal location of the particular first cable section, wherein the second cable section has a second, different cross-sectional size, and wherein second sensors are transversely spaced across a cross section of the second cable section at a longitudinal location of the second cable section, wherein a transverse spacing between the first sensors is different from a transverse spacing between the second sensors.

20. The method of claim 19, wherein the cross section of the particular first cable section is of a shape different from a shape different from a shape of the cross section of the second cable section.

21. The method of claim 20, wherein the shape of the cross section of the particular first cable section is circular, and the shape of the cross section of the second cable section is non-circular.

22. A method for acquiring seismic data in a body of water overlying earth strata, comprising:
generating acoustic waves using a towed source array;
measuring acoustic wave reflections from the strata using a plurality of first cable sections each employing a first sensor configuration therein; and
measuring the acoustic wave reflections from the strata using at least one second cable section operatively connected to one or more of the first cable sections and employing a second sensor configuration therein, wherein the first cable sections are operatively connected in series to substantially define one or more single streamers, and wherein each second cable section comprises two or more cable sections operatively connected in parallel, and wherein each single streamer comprises three second cable sections connected in parallel with one or more of the first cable sections.

23. The method of claim 22, wherein at least one second cable section is positioned upstream of the first cable sections within the single streamer.

24. The method of claim 22, wherein at least one second cable section is positioned between two of the first cable sections within each single streamer.

* * * * *